United States Patent
Jalink, Jr. et al.

[11] Patent Number: 5,961,096
[45] Date of Patent: Oct. 5, 1999

[54] FERROELECTRIC FLUID FLOW CONTROL VALVE

[75] Inventors: Antony Jalink, Jr., Newport News; Richard F. Hellbaum, Hampton; Wayne W. Rohrbach, Yorktown, all of Va.

[73] Assignee: The United States of America as represented by the Administrator of the National Aeronautics and Space Administration, Washington, D.C.

[21] Appl. No.: 08/832,260

[22] Filed: Apr. 3, 1997

Related U.S. Application Data

[60] Provisional application No. 60/015,969, Apr. 3, 1996.

[51] Int. Cl.⁶ .................................................... F16K 31/02
[52] U.S. Cl. ...................................... 251/129.06; 251/331
[58] Field of Search ...................... 29/25.35; 251/129.06, 251/129.01, 901, 331, 129.02, 129.08

[56] References Cited

U.S. PATENT DOCUMENTS

| | | | |
|---|---|---|---|
| 3,174,716 | 3/1965 | Salter | 251/129.06 |
| 4,581,624 | 4/1986 | O'Connor | 251/129.06 |
| 4,610,426 | 9/1986 | Brandner | 251/129.06 |
| 5,029,805 | 7/1991 | Albarda et al. | 251/129.06 |
| 5,471,721 | 12/1995 | Haertling | 29/25.35 |
| 5,802,195 | 9/1998 | Regan et al. | 381/190 |

FOREIGN PATENT DOCUMENTS

| | | | |
|---|---|---|---|
| 65968 | 4/1985 | Japan | 251/129.06 |
| 118915 | 6/1985 | Japan | 251/129.06 |
| 28585 | 2/1987 | Japan | 251/129.06 |
| 108482 | 4/1989 | Japan | 251/129.06 |

*Primary Examiner*—John Rivell
*Assistant Examiner*—Meredith H. Schoenfeld
*Attorney, Agent, or Firm*—Robin W. Edwards

[57] ABSTRACT

An active valve is controlled and driven by external electrical actuation of a ferroelectric actuator to provide for improved passage of the fluid during certain time periods and to provide positive closure of the valve during other time periods. The valve provides improved passage in the direction of flow and positive closure in the direction against the flow. The actuator is a dome shaped internally prestressed ferroelectric actuator having a curvature, said dome shaped actuator having a rim and an apex, and a dome height measured from a plane through said rim said apex that varies with an electric voltage applied between an inside and an outside surface of said dome shaped actuator.

9 Claims, 2 Drawing Sheets

FERROELECTRIC FLUID FLOW CONTROL VALVE

CLAIM OF BENEFIT OF PROVISIONAL APPLICATION

Pursuant to 35 U.S.C. §119, the benefit of priority from provisional application Ser. No. 60/015,969, with a filing date of Apr. 3, 1996, is claimed for this non-provisional application.

ORIGIN OF THE INVENTION

The invention described herein was made by employees of the United States Government and may be manufactured and used by the government for governmental purposes without the payment of any royalties thereon or therefore.

CROSS REFERENCE TO RELATED CASES

This application is related to commonly owned application Ser. No. 08/840,111, filed Apr. 3, 1997, entitled "Ferroelectric Stirling-Cycle Refrigerator" now U.S. Pat. No. 5,867,991, and commonly owned application Ser. No. 08/832,246, filed Apr. 3, 1997, entitled "Ferroelectric Pump."

BACKGROUND OF THE INVENTION

1. Field of the Invention

This invention relates to fluid flow control valves, and more particularly to ferroelectric active fluid flow control valves which provide improved passage of the fluid during certain time periods and provides positive closure of the valve during other time periods.

2. Description of the Related Art

Fluid flow applications often require a valve which, during certain time periods, allows unimpeded passage of the fluid and, during other time periods, allows no passage of the fluid. A "one-way valve", also known as a "check valve", is an example of such a valve. It allows unimpeded passage of the fluid in one direction ("with the direction of flow") and no passage of the fluid in the opposite direction ("against the direction of flow").

Current check valves use the action of the reversal of fluid flow to activate the valving action, and also use electromagnetic or other actuation of the valving action. These passive check valves require the fluid flow to activate the valving action. The need for the fluid to activate the valve can lead to an undesirable amount of resistance against the fluid flow. This is lost effort which must be delivered by the pump. Also, the closure of the valve by the liquid requires an undesirable fluid volume amount (flow in the wrong direction). This "dead" space requires the pump to deliver a fluid flow volume that is wasted. Currently available active check valves require complex mechanisms to allow external electrical actuation to be effected.

STATEMENT OF INVENTION

Accordingly, one object of the invention is to provide an active valve which is controlled and driven by external electrical actuation.

Another object is to provide a valve which during certain time periods allows unimpeded passage of fluid and during other time periods allows no passage of fluid.

Another object of the invention is to provide a valve which does not require fluid flow to activate the valving action.

A further object of the invention is to provide a valve which utilizes a ferroelectric component to open and close fluid flow.

A further object is to provide a valve which utilizes a dome shaped internally prestressed ferroelectric actuator having a curvature, said dome shaped actuator having a rim and an apex, and a dome height measured from a plane through the rim to the apex that varies with an electric voltage applied between an inside and an outside surface of the dome shaped actuator.

A still further object is to provide a valve which can operate at higher frequencies before floating occurs.

Another object is to provide a valve which has chemical and contamination isolation.

Additional objects and advantages of the present invention are apparent from the drawings and specification which follow.

SUMMARY OF THE INVENTION

According to the present invention, the foregoing and other objects and advantages are attained by providing an active valve which is controlled and driven by external electrical actuation to provide for improved passage of the fluid during certain time periods and to provide positive closure of the valve during other time periods. The valve provides improved passage in the direction of flow and positive closure in the direction against the flow.

BRIEF DESCRIPTION OF THE DRAWINGS

A more complete appreciation of the invention and the many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
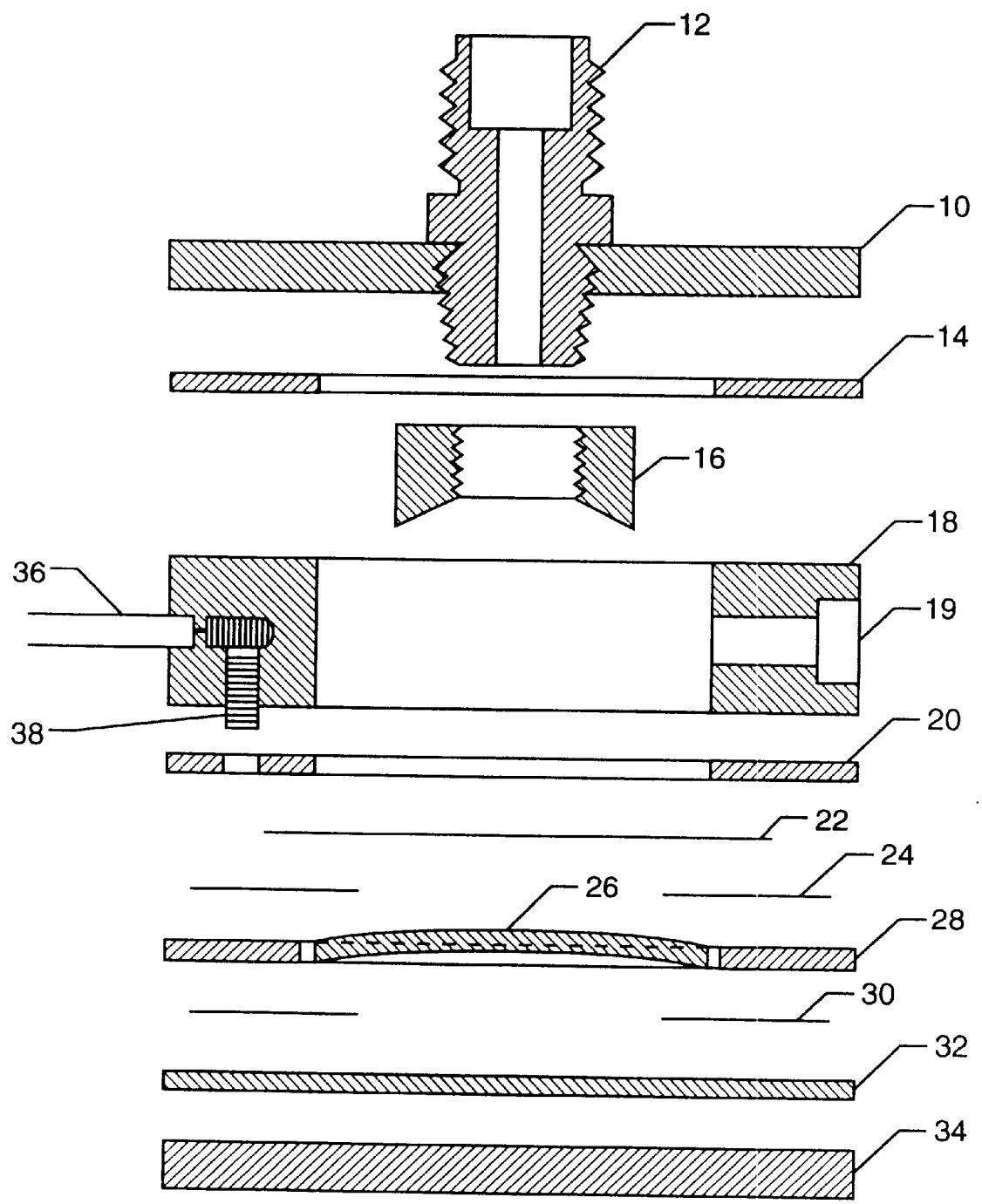
FIG. 1 is an exploded view of the fluid control valve.

FIG. 1 shows an exploded view of the ferroelectric flow control valve. The fluid flow enters the valve through the tube-to-pipe fitting inlet 12 mounted in the top cover 10. From the inlet, the fluid flows to valve stop 16. A suitable sealing gasket 14 is placed between the top cover 10 and the housing 18. The isolation membrane 22 should be compatible with the fluid and possess some elasticity; e.g., latex. The isolation membrane 22 is stretched to cover the entire surface of the ferroelectric actuator 26; the membrane stays in contact with the surface of the moving actuator 26 at all times. The isolation membrane 22 serves multiple purposes; it serves as a seal and it serves to isolate the fluid electrically and chemically from the actuator 26. The isolation membrane, through motion of the actuator 26, creates a cylindrical gap or closes off the cylindrical gap between itself and the valve stop 16, by contacting and then separating from the boundary of said valve stop 16. Actuator 26 is a dome shaped internally prestressed ferroelectric actuator having a curvature, said dome shaped actuator having a rim and an apex, and a dome height measured from a plane through the rim to the apex that varies with an electric voltage applied between an inside and an outside surface of the dome shaped actuator. Examples of such actuators are shown in U.S. Pat. No. 5,471,721, hereby incorporated by reference, and commonly available from Aura Ceramics, and in U.S. Pat. No. 5,632,841, also hereby incorporated by reference. Application of an electric voltage to the ferroelectric actuator causes an electric field between the faces of the actuator, and in response the shape of the actuator changes. The actuator will either flatten or heighten depending on the polarity of the applied electric field. This type of ferroelectric actuator inherently exhibits a favorable balance between the range of mechanical motion and the range of force it outputs. The choice of ferroelectric actuator size, along with the applied voltage and frequency, determines the specific amount of motion and force produced. This ferroelectric actuator can have strains up to several hundred percent and can sustain loads of at least ten pounds. The work capacity of the pump can be increased by using multiple ferroelectric actuators mounted on a common manifold. Twice as large excursions can be obtained from a pair of actuators stacked rim against rim in clamshell fashion. Several such clamshell assemblies can be cascaded if still larger excursions are needed. Such arrangements are described in U.S. Pat. No. 5,471,721 and in U.S. Pat. No. 5,632,841.

The cylindrical gap is opened and closed in response to displacement of actuator 26. During the periods of time when the cylindrical gap is open the fluid flow leaves the valve through the housing outlet 19. The inside diameters of the tube-to-pipe fitting 12 and valve stop 16 should be sized such that the fluid flow velocity remains constant when fluid flows through the gap created by displacement of the actuator 26. This avoids an undesirable pressure drop. Unlike existing valves, no pneumatic actuator or solenoid is required to activate a diaphragm. The actuator and its associated mounting performs the function of both the diaphragm and pneumatic actuator/solenoid.

The ferroelectric actuator 26 is mounted such that the mounting configuration isolates the actuator 26 from the fluid, supplies a path for voltage to be applied to the actuator 26, and provides for positive containment of the actuator 26 while allowing displacement of the entirety of the actuator 26 in response to an applied voltage. A housing 18 is disposed between the top cover 10 and a bottom cover 34. The actuator mount configuration comprises two nonconductive sealing gaskets 20 and 32, an electrical insulator 22, two electrical contact rings 24 and 30, an actuator spacer 28, and an actuator 26. It is preferred that the spacer 28 have the same thickness as the actuator 26. The actuator 26 is positioned within the spacer 28 such that the circumference of the actuator 26 is contiguous with the inner circumference of the spacer 28. Electrical contact rings 24 and 30 are positioned contiguous to each side of spacer 28 and provide voltage contact to the actuator 26. An electrical insulator 22 is positioned contiguous to the outside surface of the upper contact ring 24 and concentric with the actuator 26. The insulator 22 should be compatible with the pumped medium and possess some elasticity; e.g. latex. A nonconductive fluid, such as a silicon fluid, is used between the insulator 22 and the actuator 26. The fluid should be chemically stable with the other materials and be of a suitable viscosity to hold the insulator 22 and actuator 26 together. This eliminates air pockets which increases efficiency and capability. A sealing gasket 20 having a hole concentric with the contact ring 24 hole is positioned contiguous to insulator 22. The sealing gasket 20 is made from a nonconductive material such as rubber. The mounting assembly is contained by a fastening means such as machine screws. The fastening force required is only the minimum force required to adequately maintain the assembly. No prestress is required.

The design is not limited to any particular number, thickness or size of actuators. Each particular application should be considered to design component parameters; e.g., amount of actuator displacement and actuator force capability.

Figure 2:
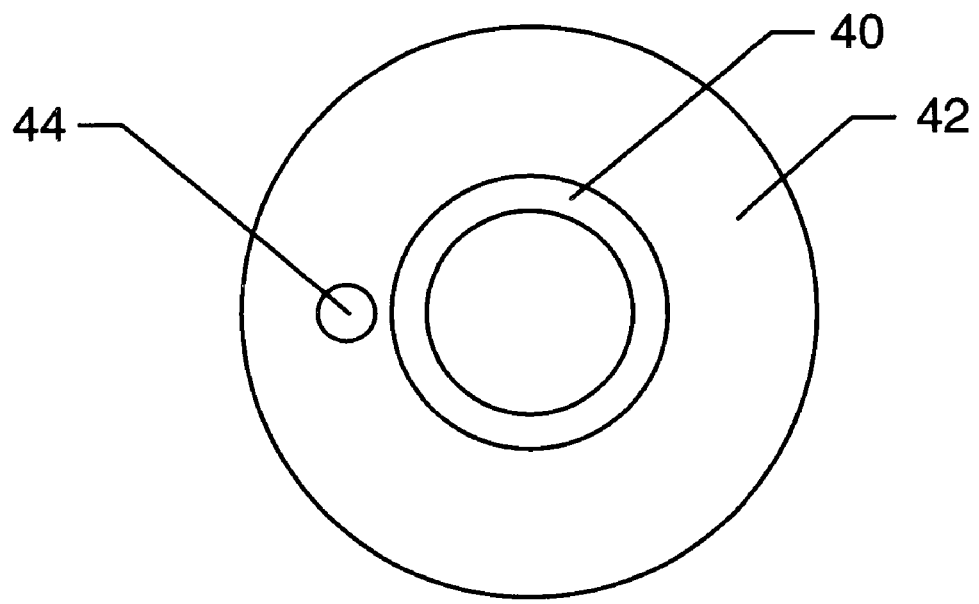
FIG. 2 is an electrical contact ring according to the present invention.

A voltage lead 36 is positioned in the housing 18 via a drilled hole in the housing 18. The lead 36 contacts a set screw spring 38 positioned in the housing 18. The set screw spring 38 contacts the electrical contact ring 24 to provide the applied voltage to the ring 24. The contact ring 24 overlaps a portion of both the spacer and the actuator. As shown in FIG. 2, the contact ring 24 has a portion 40 overlapping the actuator which is an electrical conductor such as aluminum foil. The outer portion 42 of the contact ring 24 that is in contact with the actuator is a nonconductive material which has a conductive portion 44 which contacts the set screw spring. Masking tape is one example of a suitable nonconductive material. Although circular actuators and associated circular shaped mounting components are preferred, other shapes can be utilized.

The positive and negative voltage levels applied to the actuator will vary with its thickness, with arc over resulting from too much voltage.

In an alternate embodiment the isolation membrane 22 described in the previous paragraph is monolithic with the actuator 26. In this embodiment the entire actuator 26 (both sides and its edge) is encapsulated with a polymer coating.

This ferroelectric actuator valving mechanism has lower mass than electromagnetic and pneumatic mechanisms, so it can operate at higher frequencies before the problem of floating occurs. The valve eliminates the dead-space found in current valves, especially passive valves and is simpler and more power efficient than current valves.

Obviously, numerous additional modifications and variations of the present invention are possible in light of above teachings. It is therefore to be understood that within the scope of the appended claims, the invention may be practiced otherwise than is specifically described herein.

What is claimed is:

1. A ferroelectric active fluid control valve comprising:
    a housing;
    inlet flow means through said housing;
    outlet flow means through said housing;
    a dome shaped internally prestressed ferroelectric actuator having a curvature, said dome shaped actuator having a rim and an apex, and a dome height measured from a plane through said rim to said apex, said dome height varied by a voltage means for applying an electric voltage between an inside and an outside surface of said dome shaped actuator;
    a mounting means for mounting said actuator which isolates said actuator from said fluid, supplies a path for said voltage to be applied to said actuator, allows said actuator to change height without rigidly constraining said actuator rim thereby allowing said actuator rim to pivot freely as said dome height changes, and provides for positive containment of said actuator in response to said voltage; and
    valve stop means that interfaces said inlet means with said mounting means such that the displacement of said actuator opens and closes a cylindrical flow region by which the fluid enters said outlet means.

2. The device of claim 1 wherein said inlet means comprises a tube-to-pipe fitting.

3. The device of claim 1 wherein said outlet means is a passageway through said housing.

4. The device of claim 1 wherein said housing comprises a top cover and a bottom cover.

5. The device of claim 1 wherein said cylindrical flow region is sized to maintain constant fluid velocity through said inlet means and said outlet means.

6. A ferroelectric active fluid control valve comprising:

a housing;

inlet flow means through said housing;

outlet flow means through said housing;

a dome shaped internally prestressed ferroelectric actuator having a curvature, said dome shaped actuator having a rim and an apex, and a dome height measured from a plane through said rim to said apex, said dome height varied by a voltage means for applying an electric voltage between an inside and an outside surface of said dome shaped actuator;

a mounting means for mounting said actuator which isolates said actuator from said fluid, supplies a path for said voltage to be applied to said actuator, allows said actuator to change height without rigidly constraining said rim, and provides for positive containment of said actuator in response to said voltage; and valve stop means that interfaces said inlet means with said mounting means such that the displacement of said actuator opens and closes a cylindrical flow region by which the fluid enters said outlet means;

wherein said mounting means comprises:

a spacer having a first spacer planar surface and a second spacer planar surface and having a center opening within which is positioned said actuator such that the outer boundary of said actuator is contiguous with said opening boundary;

two electrical contact layers, each contact layer having a center opening, first said contact layer positioned contiguous to a portion of said first spacer planar surface and second said contact layer positioned contiguous to a portion of said second spacer planar surface, which provides voltage to said actuator;

an isolation membrane having a first isolator planar surface and a second isolator planar surface, said first isolator planar surface centered over and positioned contiguous to a portion of the outside surface of first said contact layer and centered over said actuator;

a nonconductive fluid between said actuator and said isolator of suitable viscosity to hold said isolator and said actuator together;

a nonconductive sealing gasket having a center opening centered over said isolation membrane and positioned contiguous to said isolation membrane;

a nonconductive sealing gasket centered over and positioned contiguous to second said contact layer; and fastening means to fix said spacer, said contact layers, said isolator, and said gaskets to said housing.

7. The device of claim 1, wherein said voltage means comprises:

a voltage lead positioned in said housing; and a set screw spring contacted by said voltage lead, said spring contacting said mounting means.

8. The device of claim 6, wherein said voltage means comprises:

a voltage lead positioned in said housing; and a set screw spring contacted by said voltage lead, said spring contacting said second contact layer.

9. A ferroelectric active diaphragm for a fluid flow control valve, comprising:

a dome shaped internally prestressed ferroelectric actuator having a curvature, said dome shaped actuator having a rim and an apex, and a dome height measured from a plane through said rim to said apex, said dome height varied by a voltage means for applying an electric voltage between an inside and an outside surface of said dome shaped actuator;

a spacer having a first spacer planar surface and a second spacer planar surface and having a center opening within which is positioned said actuator such that the outer boundary of said actuator is contiguous with said opening boundary;

two electrical contact layers, each contact layer having a center opening, first said contact layer positioned contiguous to a portion of said first spacer planar surface and second said contact layer positioned contiguous to a portion of said second spacer planar surface, which provides voltage to said actuator;

an isolation membrane having a first isolator planar surface and a second isolator planar surface, said first isolator planar surface centered over and positioned contiguous to a portion of the outside surface of first said contact layer and centered over said actuator;

a nonconductive fluid between said actuator and said isolator of suitable viscosity to hold said isolator and said actuator together;

a nonconductive sealing gasket having a center opening centered over said isolation membrane and positioned contiguous to said isolation membrane;

a nonconductive sealing gasket centered over and positioned contiguous to second said contact layer; and fastening means to fix said spacer, said contact layers, said isolator, and said gaskets to a valve housing.

* * * * *